(12) United States Patent
Magnet et al.

(10) Patent No.: US 8,389,637 B2
(45) Date of Patent: Mar. 5, 2013

(54) USE OF COPOLYMERS WITH A COMPOSITION GRADIENT AS STABILIZERS IN EMULSION FREE-RADICAL POLYMERIZATION

(75) Inventors: Stephanie Magnet, Morlanne (FR); Olivier Guerret, La Tour de Salvagny (FR); Catherine Lefay, Alforville (FR); Bernadette Charleux, Vincennes (FR)

(73) Assignee: Arkema France, Colombes (FR)

( * ) Notice: Subject to any disclaimer, the term of this patent is extended or adjusted under 35 U.S.C. 154(b) by 737 days.

(21) Appl. No.: 11/722,199

(22) PCT Filed: Dec. 22, 2005

(86) PCT No.: PCT/EP2005/014169
§ 371 (c)(1),
(2), (4) Date: Oct. 13, 2009

(87) PCT Pub. No.: WO2006/066971
PCT Pub. Date: Jun. 29, 2006

(65) Prior Publication Data
US 2010/0036059 A1 Feb. 11, 2010

(30) Foreign Application Priority Data
Dec. 23, 2004 (FR) ..................... 04 13813

(51) Int. Cl.
*C08F 112/08* (2006.01)
*C08F 2/24* (2006.01)
*C08F 118/02* (2006.01)
*C08F 253/00* (2006.01)
*C08L 31/00* (2006.01)

(52) U.S. Cl. .......... 525/242; 525/88; 525/299; 525/259; 525/262; 526/317.1; 526/318; 526/319; 526/346; 524/556

(58) Field of Classification Search ............ 525/242, 525/88, 299, 259, 262; 526/317.1, 318, 319, 526/346; 524/556
See application file for complete search history.

(56) References Cited

U.S. PATENT DOCUMENTS

| 4,414,370 | A | | 11/1983 | Hamielec et al. |
| 4,529,787 | A | | 7/1985 | Schmidt et al. |
| 5,807,937 | A | * | 9/1998 | Matyjaszewski et al. .... 525/135 |
| 6,160,059 | A | | 12/2000 | Roth et al. |
| 6,218,468 | B1 | | 4/2001 | Mathauer et al. |
| 6,437,040 | B2 | | 8/2002 | Anthony et al. |
| 2005/0245650 | A1 | | 11/2005 | Deroo et al. |
| 2006/0058467 | A1 | | 3/2006 | Guerret |

FOREIGN PATENT DOCUMENTS

| DE | 196 54 168 | | 12/1996 |
| DE | 197 04 714 | | 1/1997 |
| EP | 1199326 A2 | * | 4/2002 |

OTHER PUBLICATIONS

J. Odian "Principles of Polymerization", A. John Wiley & Sons, Fouth Edition, 2004, p. 363-364.*
Matyjaszewski et al. "Gradient copolymers by atom transfer radical polymerization", J. Phys. Org. Chem., 2000, 13, p. 775-786.*
Macromol. Symp., B. Charleux, 2002, 182, pp. 249-260.
Polymeric Materials Science and Engineering, 1998, 79, pp. 440-441.
Macromolecules, 2003, 36, pp. 8260-8267.
J. Phys. Org. Chem., 2000, 13, pp. 775-786.
Macromol. Chem. Phys., 2003, 204, pp. 2055-2063.
Macromolecules, 1998, 31, pp. 5582-5587.

* cited by examiner

*Primary Examiner* — Michael M Bernshteyn
(74) *Attorney, Agent, or Firm* — Sofer & Haroun, LLP

(57) ABSTRACT

The present invention describes the use of copolymers with a composition gradient as sole stabilizer in emulsion free-radical polymerization. The copolymers of the invention are prepared via controlled free-radical polymerization and comprise at least one hydrophilic monomer such as acrylic acid and at least one hydrophobic monomer such as styrene.

34 Claims, No Drawings

USE OF COPOLYMERS WITH A COMPOSITION GRADIENT AS STABILIZERS IN EMULSION FREE-RADICAL POLYMERIZATION

FIELD OF THE INVENTION

The present invention relates to the field of emulsion free-radical polymerization, particularly using macromolecular compounds as surfactants for this type of polymerization.

BACKGROUND OF THE INVENTION

Surfactants are commonly used by those skilled in the art in emulsion polymerization processes to stabilize organic species such as monomer molecules or polymer particles in an aqueous medium. These surfactants have a quite specific structure, since they have on the same backbone a hydrophilic species and a hydrophobic species. In general, small ionic or nonionic molecules are the surfactants most commonly used in emulsion polymerization. Mention will be made, in a non-exhaustive manner, of sodium lauryl sulphate (SLS) and sodium dodecylbenzenesulphonate (NaDDBS).

However, the use of such surfactants may generate problems in the final application of latices. The reason for this is that these surfactant molecules generally of low molar mass have a tendency to migrate to the polymer-substrate interface, which is generally reflected by an impairment in the properties of the films or particles produced with the latices.

Thus, mastering the properties of the surfactant makes it possible to control the application properties of latices, for instance control of the viscosity of the latex, or control of the "plate-out" phenomena (formation of deposits on extrusion tools), which is of interest in various fields of use of latices, such as paint formulations, plastics additives or cosmetic formulations.

In order to circumvent the difficulties mentioned above, alternative methods, for instance the use of reactive surfactant molecules, have been used. This method considerably increases the performance qualities of the latex due to the capacity of the surfactant to react covalently with the monomer. With the surfactant thus attached to the surface of the polymer particles, all problems of migration are thus avoided.

Still in the perspective of minimizing the migration of the surfactant, an alternative method consists in using macromolecular surfactants in the emulsion polymerization process. Due to their macromolecular nature, these polymeric surfactants make it possible to overcome the problems mentioned above associated, in the majority of cases, with the migration of small molecules.

These macromolecular surfactants are amphiphilic copolymers that combine a hydrophilic species and a hydrophobic species chemically bonded together on the macromolecular backbone.

The amphiphilic copolymers commonly used as surfactants in emulsion polymerization are block, random, grafted or alternating copolymers or alternatively star copolymers. These macromolecular stabilizers may be synthesized via various polymerization techniques such as anionic polymerization, standard free-radical polymerization or controlled free-radical polymerization.

The amphiphilic copolymers derived from standard free-radical polymerization are random copolymers more generally grouped under the term ASR (meaning alkali-soluble resin). They are formed from hydrophobic monomer(s), for instance styrene or α-methylstyrene, and from hydrophilic monomer(s), for instance acrylic acid or methacrylic acid.

Examples of ASRs that may be mentioned include the Joncryl copolymers from Jonhson Polymer (styrene-acrylic resins), the Neocryl copolymers (styrene-acrylic copolymers) and Haloflex copolymers (vinyl-acrylic copolymers) from Neo-Resins or the Morez 101 copolymers (styrene-acrylic resins) and Tamol® copolymers from Rohm & Haas. The latter copolymers may be copolymers of diisobutylene and of maleic acid or alternatively copolymers of maleic anhydride sodium salts.

Other examples of commonly used amphiphilic copolymers are the SMA® products produced and sold by SARTOMER. These are styrene-maleic anhydride copolymers with a molar ratio of these two monomers of between 1:1 and 4:1.

The examples of emulsion polymerization describing the use of such amphiphilic copolymers as surfactants show that these copolymers are generally not used alone, but in combination with surfactant molecules of low molar mass (U.S. Pat. No. 4,529,787, U.S. Pat. No. 4,414,370, U.S. Pat. No. 6,160,059).

When the amphiphilic copolymers mentioned above are used as sole emulsion polymerization surfactants, a major drawback lies in the need to introduce large amounts of them in order to obtain stable latices (up to 50% by weight relative to the weight content of monomers). The reason for this is that, due to the composition polydispersity of the macromolecular chains directly associated with the free-radical polymerization process that is well known to those skilled in the art, an appreciable number of polymer chains do not participate efficiently in stabilization of the latex. Even though, overall, the polymer derived from the process comprises a hydrophobic/hydrophilic ratio in proportions adequate for the surfactant property desired according to the application, the distribution of these units is not uniform in the polymer chains. These chains are then either too hydrophilic (dissolution in the aqueous phase) or too hydrophobic (dissolution in the monomers) to be present at the aqueous phase/organic phase interface as required for the application. To understand the role of the polymerization process on the distribution of the monomers in the polymer chains, reference may be made to the publication by B. Charleux (*Macromol. Symp.* 2002, 182, 249-260), which deals with the case of hydrophobic monomers, but which may also be generalized to the case of hydrophilic/hydrophobic monomer mixtures.

One method for overcoming the problems of homogeneity of composition of polymer chains that is well known to those skilled in the art is the Controlled Free-Radical Polymerization process (generally referred to as CFRP). Thus, the copolymerization of a hydrophilic monomer and a hydrophobic monomer according to the CFRP process leads to an amphiphilic copolymer in which the chemical composition of the polymer chains is uniform and similar from one chain to another. Under these conditions, a majority of macromolecular chains participate in stabilizing the latex since the composition is suited to the surfactant property of the copolymer.

In the field of amphiphilic copolymers derived from Controlled Free-Radical Polymerization, the prior art reports the use of structured materials, generally block copolymers (FR 2 838 653, WO 2002/068550, WO 2002/068487, DE 196 54 168, DE 197 04 714, DE 196 02 538, *Polymeric Materials Science and Engineering* 1998, 79 440-441).

These materials have the advantage of forming micellar aggregates in certain solvents. These micelles may then serve as sites for creating particles. The efficacy of block copolymers as surfactants has moreover already been demonstrated. Examples that will be mentioned include the case of emulsion polymerization of a methyl methacrylate/butyl acrylate mixture of 35/65 mass ratio containing 45% solids, in which the use of only 0.15% by weight of polystyrene-b-sodium polyacrylate block copolymer (in which the polystyrene block has a degree of polymerization of 10 and the poly(sodium acrylate) block has a degree of polymerization of 56), relative to the weight content of monomers makes it possible to obtain a stable latex with a mean particle diameter of about 156 nm.

However, these copolymers suffer from a preparation process that is often long and expensive, which involves a multistep synthesis. Specifically, the preparation of block copolymers involves a sequence of at least two polymerization steps (successive construction of the polymer blocks) between which is a step or devolatilization of the residual monomers present at the end of the first step. Furthermore, until very recently, the controlled free-radical polymerization techniques proposed to those skilled in the art, such as ATRP (meaning Atom-Transfer Radical Polymerization) and NMP (meaning Nitroxide-Mediated Polymerization) did not allow the direct polymerization of functionalized monomers such as acrylic acid or methacrylic acid. The introduction of the acrylic unit into the chain thus required an additional step of acidolysis of copolymers based on tert-butyl acrylate.

DETAILED DESCRIPTION OF THE INVENTION

The Applicant has found that the use of certain amphiphilic copolymers with a composition gradient produced via Controlled Free-Radical Polymerization, and more specifically via the nitroxide technique, constitutes an effective solution to the problems described above, especially the problem of the reduced efficacy of random copolymers and the problem of the relatively high cost of block copolymers.
Recently, the control of polymerization of the acrylic acid monomer in Controlled Free-Radical Polymerization via the nitroxide route has been reported (*Macromolecules* 2003, 36, 8260-8267), thus opening up a direct route of access to amphiphilic copolymers (styrene/acrylic acid type). Furthermore, the polymerization used is a process in which the hydrophilic and hydrophobic monomers are introduced simultaneously into the reactor at start of polymerization. By carefully selecting the initial ratios of the two monomers, this polymerization process allows access to amphiphilic copolymers with a composition gradient.

A first subject of the invention is thus the use, as sole stabilizer, in an emulsion polymerization process, of a copolymer with a composition gradient comprising at least two monomers, one ($M_1$) is hydrophilic and represents at least 55 mol % relative to the total of the monomers of which the copolymer is composed, the other ($M_2$) is hydrophobic and represents not more than 45 mol % of the copolymer, characterized in that the said copolymer comprises at least one monomer $M_i$ such that the probability of encountering $M_i$ in any standardized position x on the polymer chain is non-zero.

More specifically, the term "copolymers with a composition gradient" denotes copolymers in which the local monomer composition changes continuously along the chain. They may thus be differentiated from block copolymers in which the local composition changes discontinuously along the chain, and they are also different from random copolymers, which do not have any continuous variation of the composition either.

Copolymers with a composition gradient thus have physical and chemical properties that are different from those of block or random copolymers.

It would not constitute a departure from the scope of the invention if the copolymers with a composition gradient were used as stabilizer as a mixture with at least one surfactant chosen from the macromolecular or non-macromolecular surfactants usually used in emulsion polymerization. Non-limiting examples that may be mentioned include sodium lauryl sulphate (SLS), sodium dodecylbenzenesulphonate (NaDDBS) or the random copolymers described above.

The present invention also describes the conditions of specific polymerization processes that give access to amphiphilic copolymers with a composition gradient whose surfactant activity has been demonstrated in examples of emulsion polymerization of styrene, acrylic or methacrylic monomers.

As described hereinbelow, there are various polymerization methods for obtaining a copolymer with a composition gradient. It is possible in particular to use a copolymerization process of batch type or a semi-continuous polymerization process (i.e. one of the monomers is added continuously or discontinuously to the polymerization medium).

In the case of a batch process, the formation of the copolymer with a composition gradient depends on the difference between the reactivity ratios of the two monomers and also on the concentration of comonomers in the initial mixture. This is then referred to as a spontaneous composition gradient. This is possible in the case of a monomer pair with widely different reactivity ratios. Mention may be made of the example of acrylate/methacrylate and styrene/n-butyl acrylate pairs.

In the case of a semi-continuous process, the addition of one of the monomers promotes the formation of the copolymer with a composition gradient. This polymerization process applies in particular when the monomers used have similar reactivity ratios (*J. Phys. Org. Chem.* 2000, 13, 775-786, *Macromolecules* 1998, 31, 5582-5587). These are then referred to as copolymers with a forced composition gradient.

It is quite obvious that, whatever the mode of synthesis used (batch or semi-continuous), the gradient nature is proportionately more pronounced the greater the difference between the reactivity ratios of the monomers.

The process for synthesizing copolymers with a composition gradient of the invention is a batch process developed by the Applicant and described in WO 04/055 071.

In its search to solve the problems stated previously, the Applicant's choice fell to a family of amphiphilic copolymers with a composition gradient, based on acrylic acid as hydrophilic monomer ($M_{1a}$) and styrene as hydrophobic monomer ($M_2$).

However, it would not constitute a departure from the context of the invention if the hydrophobic monomer ($M_2$) were chosen from acrylic and methacrylic esters, styrene or vinyl monomers, and the ionic hydrophilic monomer ($M_{1a}$) were chosen from ethylenic carboxylic acids such as acrylic acid, methacrylic acid, itaconic acid or fumaric acid. Furthermore the presence of a neutral or cationic hydrophilic monomer ($M_{1b}$) should not be excluded, this monomer possibly being introduced to a maximum proportion of 50% by weight relative to the ionic hydrophilic monomer ($M_{1a}$).

The neutral or cationic hydrophilic monomer ($M_{1b}$) is chosen from the family of (alkoxy)polyalkylene glycol (meth)acrylates, the family of (alkoxy)polyalkylene glycol (meth)acrylamides, unsaturated carboxylic acid amides, for instance acrylamide or methacrylamide and N-substituted derivatives thereof, carboxylic anhydrides bearing a vinyl bond, such as maleic anhydride or fumaric anhydride, dialkylaminoalkyl (meth)acrylates or trialkylammoniumalkyl (meth)acrylate halides.

When the hydrophobic monomer is styrene and the hydrophilic monomer is acrylic acid as described by the Applicant, on account of the difference between the values of the reactivity ratios of the two monomers ($r_{St}$=0.72 and $r_{AA}$=0.27), the copolymer obtained has a structure with a composition gradient if conditions are used such that, at the start of reaction, it is largely above the azeotropic composition of the mixture, i.e. under conditions such that the mole fraction of acrylic acid, written $f_{AA}$, is greater than 28% (*Macromol. Chem. Phys.* 2003, 204, 2055-2063).

The copolymers with a composition gradient of the invention have a number-average mass (Mn) of between 3000 and 10 000 g/mol and preferably from 5000 to 7000, and a polydispersity index of between 1.1 and 2.5 and preferably between 1.1 and 2.

According to one preferred mode of the invention, the copolymers with a composition gradient are used in a proportion of from 1% to 10% and preferably from 3% to 6% by weight relative to the total weight of the monomers to be polymerized.

When the overall molar conversion targeted is reached (generally 80/85%), the copolymer solution is cooled to room temperature and then recovered.

The various experimental conditions are collated in the following table, in which:

$m(AA)_0$, $m(St)_0$ and $m(diox)_0$ denote the initial masses, respectively, of acrylic acid, styrene and dioxane in grams of material, targeted Mn denote the targeted number-average molar masses of the copolymer, expressed in gram per mole, t is the polymerization time, expressed in minutes, $F_{AA}$, Mn and Ip are, respectively, the overall molar composition of acrylic acid in the copolymer, the number-average molar mass of the copolymer (in grams per mole), and the polydispersity index of the copolymer chains.

| Polymer | $m(AA)_0$ (g) | $m(St)_0$ (g) | $m(diox)_0$ (g) | Targeted Mn (g/mol) | % mol SG1/Alkox | t (min) | FAA | Mn (g/mol) | Ip |
|---|---|---|---|---|---|---|---|---|---|
| 1 | 20.7 | 30 | 139 | 11 500 | 5 | 240 | 0.39 | 8400 | 1.21 |
| 2 | 110 | 40 | 500 | 10 500 | 5 | 180 | 0.63 | 6000 | 1.30 |
| 3 | 167.5 | 103 | 400 | 10 000 | 0 | 90 | 0.55 | 6200 | 1.21 |
| 4 | 32 | 11.5 | 145 | 10 500 | 5 | 50 | 0.54 | 3600 | 1.22 |
| 5 | 32 | 11.5 | 145 | 5500 | 5 | 180 | 0.64 | 3600 | 1.25 |
| 6 | 32 | 11.5 | 145 | 10 500 | 5 | 480 | 0.67 | 6600 | 1.49 |
| 7 | 32 | 11.5 | 145 | 15 700 | 5 | 480 | 0.67 | 8500 | 1.49 |
| 8 | 110 | 40 | 500 | 10 500 | 5 | 480 | 0.67 | 6500 | 1.53 |

The examples that follow illustrate the invention without limiting its scope.

Example 1

Synthesis of Styrene/Acrylic Acid Copolymers with a Composition Gradient

The copolymers of the invention are prepared according to the standard recipe described below.

Into a 250 mL glass reactor equipped with a variable-speed stirring motor, inlets for introducing reagents, bleed lines for introducing inert gases to flush out the oxygen, for instance nitrogen, and measuring probes (e.g., for measuring the temperature) and a heating system composed of an oil bath, is introduced, at room temperature, a solution composed of:
styrene (Aldrich, 99% pure), noted as "St"
acrylic acid (Aldrich), noted as "AA"
1,4-dioxane (Aldrich, for synthesis), noted as "Diox"
2-methyl-2-[N-tert-butyl-N-(diethoxyphosphoryl-2,2-dimethylpropyl)aminoxy]propionic acid, which will be referred to hereinbelow by the abbreviation "Alkox" (from Arkema—99% pure)
N-tert-butyl-N-(1-diethylphosphono-2,2-dimethylpropyl) nitroxide, noted as "SG1" (from Arkema—85% pure).

The amount of alkoxyamine introduced depends on the target molar masses of the copolymers. The amounts of starting materials used are described in the table below.

Degassing is then performed by sparging with nitrogen at room temperature for 5 minutes and with stirring at 300 rpm. A pressure of 2 bar is then applied and the nominal temperature of the reactor is set at 120° C.

The time zero for the polymerization is chosen when the temperature of the reactor reaches 90° C. Samples are taken regularly and immersed in an ice bath to stop the polymerization. The conversion over time for each of the monomers is determined by $^1$H NMR.

Example 2

Use of Styrene/Acrylic Acid Copolymers with a Composition Gradient as Surfactants in the Emulsion Polymerization of Styrene

Example 2A

The Examples that follow describe the synthesis of styrene latex containing 25% solids, at 70° C., batchwise and using 6% by weight of styrene/acrylic acid copolymer as sole emulsion surfactant.

To begin with, a solution is prepared composed of:
100 g of water,
0.12 g of $NaHCO_3$ such that $[NaHCO_3]_{aq}$=0.012 mol.L$^{-1}$
2.4 g of styrene/acrylic acid copolymer with a composition gradient as prepared according to Example 1,
a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated to 70° C. for 20 minutes and the pH is then adjusted to 10 by adding a sodium hydroxide solution of normality 0.1N.

Into a 250 mL reactor equipped with a variable-speed stirring motor, inlets for introducing reagents, bleed lines for introducing inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein, is introduced the aqueous solution prepared above. This solution is then heated to 70° C. and degassed by sparging with nitrogen for 45 minutes while stirring at 300 rpm.

Separately, 40 g of styrene are degassed by sparging with nitrogen for 45 minutes and then added to the above solution at 70° C.

The reaction medium is stirred at 70° C. for 15 minutes, and 0.18 g of potassium persulphate $K_2S_2O_8$ such that $[K_2S_2O_8]_{aq}=0.006$ mol.$L^{-1}$ is then added. The time zero for the polymerization corresponds to the addition of the initiator solution to the reactor.

The polymerization is performed for 3 hours at 70° C. with stirring at 300 rpm. Samples are taken regularly and then cooled in an ice bath to stop the reaction. Each sample is analysed by dynamic light scattering (DLS) and the conversion is determined by gravimetry.

The various examples are collated in the following table, in which:

Mn and $F_{AA}$ are, respectively, the number-average molar mass of the copolymer (in grams per mole) and the overall molar composition of acrylic acid in the copolymer, Z, the mean particle diameter of the latex in nm, is determined by dynamic light scattering (DLS),

| Polymer | Mn (g·mol$^{-1}$) | FAA | Z(nm) (DLS) | Visual observation of the latices |
|---|---|---|---|---|
| 1 | 8400 | 0.39 | nd | Sedimentation |
| 4 | 3600 | 0.54 | 160 | Sedimentation |
| 5 | 3600 | 0.64 | 130 | Stable |
| 3 | 6200 | 0.55 | 180 | Stable |
| 6 | 6600 | 0.67 | 100 | Stable |
| 7 | 8500 | 0.67 | 120 | Stable | nd = not determined

Example 2B

The following examples describe the synthesis of styrene latex containing 45% solids, at 70° C., via continuous addition of monomer and using 3% by weight of styrenelacrylic acid copolymer with a composition gradient as sole emulsion surfactant.

Firstly, a solution is prepared composed of:
44 g of water,
0.055 g of $NaHCO_3$ such that $[NaHCO_3]_{aq}=0.012$ mol.$L^{-1}$
1.37 g of styrene/acrylic acid copolymer with a composition gradient as prepared according to Example 1,
a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated at 70° C. for 20 minutes and the pH is then adjusted to 10 by addition of a sodium hydroxide solution of normality 0.1N.

The aqueous solution prepared above is introduced into a 250 mL reactor equipped with a variable-speed stirring motor, inlets for introduction of reagents, bleed lines for introduction of inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein. This solution is then heated to 70° C. and degassed by sparging with nitrogen for 45 minutes with stirring at 300 rpm.

Separately, 45.5 g of styrene are degassed by sparging with nitrogen for 45 minutes and then added continuously to the reactor using a peristaltic pump over a period of 4 hours. When the addition of the styrene is commenced, 0.06 g of potassium persulphate $K_2S_2O_8$ such that $[K_2S_2O_8]_{aq}=0.006$ mol.$L^{-1}$ is added. The time zero for the polymerization corresponds to the addition of the initiator solution to the reactor. The polymerization is performed for the 4 hours of addition of the styrene at 70° C. with stirring at 300 rpm, and is then continued for 1 hour under the same conditions, with addition of an additional amount of initiator. A sample is taken at the end of the reaction and then cooled in an ice bath to stop the reaction. This sample is analysed by dynamic light scattering (DLS) and the conversion is determined by gravimetry.

An example is presented in the table below, in which:

Mn and $F_{AA}$ are, respectively, the number-average molar mass of the copolymer (in grams per mole) and the overall molar composition of acrylic acid in the copolymer, Z, the mean particle diameter of the latex in nm, is determined by dynamic light scattering (DLS).

| Polymer | Mn (g·mol$^{-1}$) | FAA | Z(nm) (DLS) | Visual observation for latices |
|---|---|---|---|---|
| 8 | 6500 | 0.67 | 160 | Stable |

Example 3

Comparative with Example 2B

Use of Styrenelacrylic Acid Random Copolymers as Surfactants in the Emulsion Polymerization of Styrene This example describes the use, as sole surfactant, of styrene/acrylic acid random copolymers in the synthesis of styrene latex containing 45% solids, at 70° C., via continuous addition of monomer.

The random copolymers tested are JONCRYL® 682 and JONCRYL® 683. They are noted hereinbelow, respectively, as J682 and J683, and their characteristics as described by Johnson Polymer are presented in the table below.

| Copolymers | J682 | J683 |
|---|---|---|
| Weight-average molar mass (g/mol) | 1750 | 8700 |
| Number of acid functions (on solid) | 238 | 166 |

In the case of using 3% (25%) by weight of copolymer relative to the monomer, a solution is prepared, on the one hand, composed of:
50 g (10 g) of water,
0.055 g (0.045 g) of $NaHCO_3$ such that $[NaHCO_3]_{aq}=0.012$ mol.$L^{-1}$
1.37 g (11.4 g) of styrene/acrylic acid copolymer,
a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated at 70° C. for 20 minutes and the pH is then adjusted to 10 by adding a sodium hydroxide solution of normality 0.1N. The solution is then heated for a further 30 minutes at 70° C. and then for 20 minutes at 80° C.

The aqueous solution prepared above is introduced into a 250 mL reactor equipped with a variable-speed stirring motor, inlets for introduction of reagents, bleed lines for introduction of inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein. This solution is then heated to 70° C. and degassed by sparging with nitrogen for 45 minutes with stirring at 300 rpm.

Separately, 45.5 g of styrene are degassed by sparging with nitrogen for 45 minutes and then added continuously to the reactor using a peristaltic pump over a period of 4 hours. When the addition of the styrene is commenced, 0.09 g (0.075 g) of potassium persulphate $K_2S_2O_8$ such that $[K_2S_2O_8]_{aq}=0.006$ mol.$L^{-1}$ is added. The time zero for the polymerization corresponds to the addition of the initiator solution to the reactor.

The polymerization is performed for the 4 hours of addition of the styrene at 70° C. with stirring at 300 rpm, and is then continued for 1 hour under the same conditions, with addition of an additional amount of initiator. A sample is taken at the end of the reaction and then cooled in an ice bath to stop the reaction. This sample is analysed by dynamic light scattering (DLS) and the conversion is determined by gravimetry.

The various examples are collated in the following table, in which:
- Z, the mean particle diameter of the latex in nm, is determined by dynamic light scattering (DLS)

| Polymer | weight % polymer/St | Z(nm) (DLS) | Visual observation of the latices |
|---|---|---|---|
| 8 | 3 | 155 | Stable |
| J683 | 3 | nd | Unstable |
| J682 | 3 | nd | Unstable |
| J683 | 25 | 220 | Stable | nd means not determined

The "polymer 8" example is according to the invention.

Example 4

Use of Styrene/acrylic Acid Copolymers with a Composition Gradient as Surfactants in the Emulsion Polymerization of Butyl Acrylate The following example describes the synthesis of butyl acrylate latex containing 25% solids, at 70° C., via continuous addition of monomer and using from 5% to 20% by weight of styrene/acrylic acid copolymer as sole emulsion surfactant.

Firstly, a solution is prepared composed of:
- an amount of water ranging between 45 and 100 g
- 0.12 g of $NaHCO_3$ such that $[NaHCO_3]_{aq}=0.012$ mol.$L^{-1}$
- the appropriate amount of styrene/acrylic acid copolymer with a composition gradient as prepared according to Example 1,
- a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated at 70° C. for 20 minutes and the pH is then adjusted to 10 by addition of a sodium hydroxide solution of normality 0.1N.

The aqueous solution prepared above is introduced into a 250 mL reactor equipped with a variable-speed stirring motor, inlets for introduction of reagents, bleed lines for introduction of inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein. This solution is then heated to 70° C. and degassed by sparging with nitrogen for 45 minutes with stirring at 300 rpm.

Separately, 40 g of butyl acrylate are degassed by sparging with nitrogen for 45 minutes and then added continuously to the reactor using a peristaltic pump over a period of 4 hours. When the addition of the monomer is commenced, 0.18 g of potassium persulphate $K_2S_2O_8$ such that $[K_2S_2O_8]_{aq}=0.006$ mol.$L^{-1}$ is added. The time zero for the polymerization corresponds to the addition of the initiator solution to the reactor.

The polymerization is performed for the 4 hours of addition of the monomer at 70° C. with stirring at 300 rpm, and is then continued for 1 hour under the same conditions, with addition of an additional amount of initiator. A sample is taken at the end of the reaction and then cooled in an ice bath to stop the reaction. This sample is analysed by dynamic light scattering (DLS) and the conversion is determined by gravimetry.

The various examples are presented in the table below, in which:
- Mn and $F_{AA}$ are, respectively, the number-average molar mass of the copolymer (in grams per mole) and the overall molar composition of acrylic acid in the copolymer,
- Z, the mean particle diameter of the latex in nm, is determined by dynamic light scattering (DLS).

| Polymer | Mn (g·mol$^{-1}$) | FAA | Weight % polymer 8 | Z(nm) (DLS) | Visual observation of the latices |
|---|---|---|---|---|---|
| 8 | 6500 | 0.67 | 20 | 125 | Stable |
| 8 | 6500 | 0.67 | 15 | 125 | Stable |
| 8 | 6500 | 0.67 | 10 | 135 | Stable |
| 8 | 6500 | 0.67 | 7.5 | 135 | Stable |
| 8 | 6500 | 0.67 | 5 | 130 | Stable |

Example 5

Use of Styrene-Acrylic Acid Copolymers with a Composition Gradient as Surfactants in the Emulsion Polymerization of a Methyl Methacrylate/Butyl Acrylate Mixture (35/65% by Weight)

The following example describes the synthesis of methyl methacrylate/butyl acrylate latex containing 45% solids, at 70° C., via continuous addition of monomers and using 3% by weight of styrene/acrylic acid copolymer with a composition gradient as sole emulsion surfactant.

Firstly, a solution is prepared composed of:
- 44 g of water,
- 0.055 g of $NaHCO_3$ such that $[NaHCO_3]_{aq}=0.012$ mol.$L^{-1}$
- 1.37 g of styrene/acrylic acid copolymer with a composition gradient as prepared according to Example 1, a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated at 70° C. for 20 minutes and the pH is then adjusted to 10 by addition of a sodium hydroxide solution of normality 0.1N.

The aqueous solution prepared above is introduced into a 250 mL reactor equipped with a variable-speed stirring motor, inlets for introduction of reagents, bleed lines for introduction of inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein. This solution is then heated to 70° C. and degassed by sparging with nitrogen for 45 minutes with stirring at 300 rpm.

Separately, a mixture of 16 g of methyl methacrylate and 30 g of butyl acrylate is degassed by sparging with nitrogen for 45 minutes and then added continuously to the reactor using a peristaltic pump over a period of 4 hours. When the addition of the monomers is commenced, 0.06 g of potassium persulphate $K_2S_2O_8$ such that $[K_2S_2O_8]_{aq}=0.006$ mol.$L^{-1}$ is added. The time zero for the polymerization corresponds to the addition of the initiator solution to the reactor.

The polymerization is performed for the 4 hours of addition of the monomers at 70° C. with stirring at 300 rpm, and is then continued for 1 hour under the same conditions, with addition of an additional amount of initiator. A sample is taken at the end of the reaction and then cooled in an ice bath to stop the reaction. This sample is analysed by dynamic light scattering (DLS) and the conversion is determined by gravimetry.

An example is presented in the table below, in which:
  Mn and $F_{AA}$ are, respectively, the number-average molar mass of the copolymer (in grams per mole) and the overall molar composition of acrylic acid in the copolymer,
  Z, the mean particle diameter of the latex in nm, is determined by dynamic light scattering (DLS).

| Polymer | Mn (g · mol$^{-1}$) | FAA | Z(nm) (DLS) | Visual observation of the latices |
|---|---|---|---|---|
| 8 | 6500 | 0.67 | 200 | Stable |

Example 6

Comparative with Example 5

Use of Styrene/acrylic Acid Random Copolymers as Surfactants in the Emulsion Polymerization of a Methyl Methacrylate/Butyl Acrylate Mixture (35/65% by Weight)

This example describes the use, as sole surfactant, of styrene/acrylic acid random copolymers (J682 and J683 as described in Example 3) in the synthesis of latex of a methyl methacrylate/butyl acrylate mixture containing 45% solids, at 70° C., via continuous addition of monomers.

In the case of using 3% (25%) by weight of copolymer relative to the monomers, a solution is prepared, on the one hand, composed of:

50 g (10 g) of water,
  0.055 g (0.045 g) of $NaHCO_3$ such that $[NaHCO_3]_{aq}=0.012$ mol.$L^{-1}$
  1.37 g (11.4 g) of styrene/acrylic acid copolymer,
  a sodium hydroxide solution of normality 1N, the amount of which is adjusted as a function of the copolymer used so as to neutralize all of the acid functions of the copolymer. The number of acid functions per gram of copolymer is determined beforehand by assaying with a sodium hydroxide solution of normality 0.1N.

This solution is heated at 70° C. for 20 minutes and the pH is then adjusted to 10 by adding a sodium hydroxide solution of normality 0.1N. The solution is then heated for a further 30 minutes at 70° C. and then for 20 minutes at 80° C.

The aqueous solution prepared above is introduced into a 250 mL reactor equipped with a variable-speed stirring motor, inlets for introduction of reagents, bleed lines for introduction of inert gases to flush out the oxygen, for instance nitrogen, and measuring probes (e.g., for measuring the temperature), a system of vapour condensation with reflux, and a jacket for heating/cooling the contents of the reactor by circulating a heat-exchange fluid therein. This solution is then heated to 70° C. and degassed by sparging with nitrogen for 45 minutes with stirring at 300 rpm.

Separately, a mixture of 16 g of methyl methacrylate and 30 g of butyl acrylate is degassed by sparging with nitrogen for 45 minutes and then added continuously to the reactor using a peristaltic pump over a period of 4 hours. When the addition of the monomers is commenced, 0.09 g (0.075 g) of potassium persulphate $K_2S_2O_8$ such that $[K_2S_2O_8]_{aq}=0.006$ mol.$L^{-1}$ is added. The time zero for the polymerization corresponds to the addition of the initiator solution to the reactor.

The polymerization is performed for the 4 hours of addition of the monomers at 70° C. with stirring at 300 rpm, and is then continued for 1 hour under the same conditions, with addition of an additional amount of initiator. A sample is taken at the end of the reaction and then cooled in an ice bath to stop the reaction. This sample is analysed by dynamic light scattering (DLS) and the conversion is determined by gravimetry.

The various examples are collated in the following table, in which:
  Z, the mean particle diameter of the latex in nm, is determined by dynamic light scattering (DLS)

| Polymer | Weight % polymer/monomers | Z(nm) (DLS) | Visual observation of the latices |
|---|---|---|---|
| 8 | 3 | 200 | Stable |
| J683 | 3 | nd | Unstable |
| J682 | 3 | nd | Unstable |
| J683 | 25 | nd | Unstable | nd means not determined

The invention claimed is:

1. An emulsion polymerization method, said method comprising the step of:
  employing a sole stabilizer, wherein said sole stabilizer is a copolymer with a composition gradient comprising at least two monomers,
  one ($M_1$) is hydrophilic and represents at least 55 mol % relative to the total of the monomers of which the copolymer is composed,
  the other ($M_2$) is hydrophobic and represents not more than 45 mmol % of the copolymer, wherein said copolymer has at least one monomer $M_i$ such that the probability of encountering $M_i$ in any standardized position x on the polymer chain is non-zero.

2. An emulsion polymerization method, said method comprising the steps of:
employing a stabilizer, wherein said stabilizer is a copolymer with a composition gradient comprising at least two monomers,
one ($M_1$) is hydrophilic and represents at least 55 mol % relative to the total of the monomers of which the copolymer is composed,
the other ($M_2$) is hydrophobic and represents not more than 45 mol % of the copolymer,
wherein said copolymer has at least one monomer $M_i$ such that the probability of encountering $M_i$ in any standardized position x on the polymer chain is non-zero, and has
wherein said stabilizer has at least one other stabilizing component selected from the group consisting of macromolecular and non-macromolecular surfactants selected from the group consisting of random copolymers, block copolymers with at least one hydrophilic monomer and at least one hydrophobic monomer, sodium lauryl sulphate (SLS) and sodium dodecylbenzenesulphonate (NaDDBS).

3. The method according to claim 1, wherein in said emulsion polymerization process said copolymer is introduced to a proportion of from 1 to 10% by weight relative to the total weight of the monomers to be polymerized.

4. The method according to claim 1, wherein the said copolymer has a number-average mass (Mn) of between 3000 and 10 000 g/mol.

5. The method according to claim 1, wherein the said hydrophilic monomer represents at least 65 mol % of the copolymer.

6. The method according to claim 1, wherein the hydrophilic monomer ($M_1$) is an ionic hydrophilic monomer noted as ($M_{1a}$) and selected from the group consisting of ethylenic carboxylic acids, ($M_{1a}$) being used as the hydrophilic monomer alone or in combination with a neutral or cationic hydrophilic monomer ($M_{1b}$) selected from the group consisting of (alkoxy)polyalkylene glycol (meth)acrylates, (alkoxy)polyalkylene glycol (meth)acrylamides, unsaturated carboxylic acid amides and carboxylic anhydrides bearing a vinyl bond, ($M_{1b}$) being introduced to a maximum proportion of 50% by weight relative to the ionic hydrophilic monomer ($M_{1a}$).

7. The method according to claim 6, wherein the hydrophilic monomer is acrylic acid.

8. The method according to claim 1, wherein the hydrophobic monomer is selected from the group consisting of acrylic esters, methacrylic esters, styrene monomers and vinyl monomers.

9. The method according to claim 7, wherein the hydrophobic monomer is styrene.

10. The method according to claim 1, further comprising the step of
production of a latex via emulsion free-radical polymerization stabilized with said copolymer with said composition gradient according to claim 1.

11. The method according to claim 10, wherein said latex has a viscosity of greater than 1000 centipoises.

12. The method according to claim 1, further comprising the step of: obtaining a paint formulation employing latices obtained according to claim 10.

13. The method according to claim 1, further comprising the step of: obtaining a cosmetics formulation employing latices obtained according to claim 10.

14. The method according to claim 1, further comprising the step of:
obtaining a plastic additive in the field of "core/shell" additives employing latices obtained according to claim 10.

15. The method according to claim 1, further comprising the step of:
obtaining a hot-melt adhesive employing latices obtained according to claim 10.

16. The method according to claim 3, wherein the said copolymer is introduced to a proportion of from 3% to 6% by weight relative to the total weight of the monomers to be polymerized.

17. The method according to claim 4, wherein the said copolymer has a number-average mass (Mn) of between 5000 to 7000.

18. The method according to claim 1, wherein the said copolymer has a polydispersity index of between 1.1 and 2.5.

19. The method according to claim 18, wherein the said copolymer has a polydispersity index of between 1.1 and 2.

20. The method according to claim 6, wherein the said ethylenic carboxylic acids is selected from the group consisting of acrylic acid, methacrylic acid, itaconic acid and fumaric acid.

21. The method according to claim 6, wherein the said unsaturated carboxylic acid amide is selected from the group consisting of acrylamide, methacrylamide and N-substituted derivatives thereof.

22. The method according to claim 6, wherein the said carboxylic anhydride bearing a vinyl bond is selected from the group consisting of maleic anhydride, fumaric anhydride, dialkylaminoalkyl (meth)acrylates and trialkylammoniumalkyl (meth)acrylate halides.

23. The method according to claim 2, wherein the said copolymer is introduced to a proportion of from 1 to 10% by weight relative to the total weight of the monomers to be polymerized.

24. The method according to claim 2, wherein the said copolymer has a number-average mass (Mn) of between 3000 and 10 000 g/mol.

25. The method according to claim 24, wherein the said copolymer has a number-average mass (Mn) of between 5000 to 7000.

26. The method according to claim 2, wherein the said copolymer has a polydispersity index of 1.1.

27. The method according to claim 26, wherein the said copolymer has a polydispersity index of between 1.1 and 2.

28. The method according to claim 2, wherein the hydrophilic monomer ($M_1$) is an ionic hydrophilic monomer noted as ($M_{1a}$) and selected from the group consisting of ethylenic carboxylic acids, ($M_{1a}$) being used as the hydrophilic monomer alone and in combination with a neutral or cationic hydrophilic monomer ($M_{1b}$) selected from the group consisting of (alkoxy)polyalkylene glycol (meth)acrylates, (alkoxy)polyalkylene glycol (meth)acrylamides, unsaturated carboxylic acid amides and carboxylic anhydrides bearing a vinyl bond, ($M_{1b}$) being introduced to a maximum proportion of 50% by weight relative to the ionic hydrophilic monomer ($M_{1a}$).

29. The method according to claim 28, wherein the hydrophilic monomer is acrylic acid.

30. The method according to claim 28, wherein the said ethylenic carboxylic acid is selected from the group consisting of acrylic acid, methacrylic acid, itaconic acid and fumaric acid.

31. The method according to claim 28, wherein the said unsaturated carboxylic acid amide is selected from the group consisting of acrylamide, methacrylamide and N-substituted derivatives thereof.

32. The method according to claim 28, wherein the said carboxylic anhydride bearing a vinyl bond is selected from the group consisting of maleic anhydride, fumaric anhydride, dialkylaminoalkyl (meth)acrylates and trialkylammoniumalkyl (meth)acrylate halides.

33. The method according to claim 2, wherein the hydrophobic monomer is selected from the group consisting of acrylic esters, methacrylic esters, styrene monomers and vinyl monomers.

34. The method according to claim 30, wherein the hydrophobic monomer is styrene.

* * * * *

UNITED STATES PATENT AND TRADEMARK OFFICE
CERTIFICATE OF CORRECTION

PATENT NO. : 8,389,637 B2
APPLICATION NO. : 11/722199
DATED : March 5, 2013
INVENTOR(S) : Magnet et al.

Page 1 of 1

It is certified that error appears in the above-identified patent and that said Letters Patent is hereby corrected as shown below:

In the Claims

Column 13, Claim 2 Line 18: the word "other" should be deleted

Signed and Sealed this
Twenty-eighth Day of May, 2013

Teresa Stanek Rea
*Acting Director of the United States Patent and Trademark Office*